(12) United States Patent
Zhang et al.

(10) Patent No.: US 11,755,520 B2
(45) Date of Patent: Sep. 12, 2023

(54) DUAL-MODE SIDEBAND INTERFACE FOR SMART NETWORK INTERFACE CONTROLLER

(71) Applicant: Dell Products L.P., Round Rock, TX (US)

(72) Inventors: Zheng Zhang, Shanghai (CN); Mahmoud B. Ahmadian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/563,546

(22) Filed: Dec. 28, 2021

(65) Prior Publication Data
US 2023/0205719 A1    Jun. 29, 2023

(51) Int. Cl.
*G06F 13/36* (2006.01)
*G06F 13/40* (2006.01)
*G06F 13/42* (2006.01)

(52) U.S. Cl.
CPC ...... *G06F 13/4022* (2013.01); *G06F 13/4221* (2013.01); *G06F 2213/0026* (2013.01)

(58) Field of Classification Search
CPC ............. G06F 13/4022; G06F 13/4221; G06F 2213/0026
See application file for complete search history.

(56) References Cited

U.S. PATENT DOCUMENTS

| | | | |
|---|---|---|---|
| 11,086,813 B1 * | 8/2021 | Schuette | G06F 13/4022 |
| 2016/0357695 A1 * | 12/2016 | Johnston | G06F 13/4282 |
| 2018/0341619 A1 * | 11/2018 | Slik | G06F 3/0614 |
| 2019/0235616 A1 * | 8/2019 | Norden | G06F 1/3293 |

* cited by examiner

*Primary Examiner* — Henry Tsai
*Assistant Examiner* — Kim T Huynh
(74) *Attorney, Agent, or Firm* — Jackson Walker L.L.P.

(57) ABSTRACT

An information handling system may include a host system including a first root complex, a management controller including a second root complex, a network interface controller, and at least one switching circuit. The information handling system may be configured to, in response to the host system being powered on: couple the network interface controller to the management controller via the first root complex; and wherein the information handling system is further configured to, in response to the host system being powered off: activate the at least one switching circuit to couple the network interface controller to the management controller via the second root complex.

18 Claims, 3 Drawing Sheets

DUAL-MODE SIDEBAND INTERFACE FOR SMART NETWORK INTERFACE CONTROLLER

TECHNICAL FIELD

The present disclosure relates in general to information handling systems, and more particularly to methods and systems for coupling to a smart network interface controller while a host system is offline.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably.

There are currently several ways to establish a sideband connection between a SmartNIC and a management controller such as a baseboard management controller (BMC). For example, a network controller sideband interface (NC-SI) connection may be established over reduced media-independent interface (RMII) based transport (RBT), over Peripheral Component Interconnect Express (PCIe) vendor defined message (VDM), over System Management Bus (SMBus), etc.

A SmartNIC is an advanced network controller which may be configured to run programs to communicate with a management controller such as a BMC via NC-SI even when the host system is powered off. Currently, a management controller and one or more SmartNICs are often connected by NC-SI over management component transport protocol (MCTP) based on PCIe VDMs to overcome various limitations of NC-SI over RBT and NC-SI over SMBus. However, PCIe VDM is not generally available after powering off the host system, because the host's PCIe root complex is then also offline. Thus the SmartNIC may lose its connection with the management controller even if power is still being applied to both the management controller and to the PCIe slot housing the SmartNIC.

This disclosure thus presents a way of establishing a dual-mode connection between the management controller and one or more SmartNICs for use in both a power-on and a power-off scenario for the host.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing SmartNIC technology within an information handling system may be reduced or eliminated.

In accordance with embodiments of the present disclosure, an information handling system may include a host system including a first root complex, a management controller including a second root complex, a network interface controller, and at least one switching circuit. The information handling system may be configured to, in response to the host system being powered on: couple the network interface controller to the management controller via the first root complex; and wherein the information handling system is further configured to, in response to the host system being powered off: activate the at least one switching circuit to couple the network interface controller to the management controller via the second root complex.

In accordance with these and other embodiments of the present disclosure, a method may include, while a host system that includes a first root complex is powered on, coupling a network interface controller to a management controller via the first root complex, wherein the management controller includes a second root complex; and in response to the host system being powered off, activate at least one switching circuit to couple the network interface controller to the management controller via the second root complex.

In accordance with these and other embodiments of the present disclosure, an article of manufacture may include a non-transitory, computer-readable medium having instructions thereon that are executable by a processor of an information handling system for: while a host system that includes a first root complex is powered on, coupling a network interface controller to a management controller via the first root complex, wherein the management controller includes a second root complex; and in response to the host system being powered off, activate at least one switching circuit to couple the network interface controller to the management controller via the second root complex.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
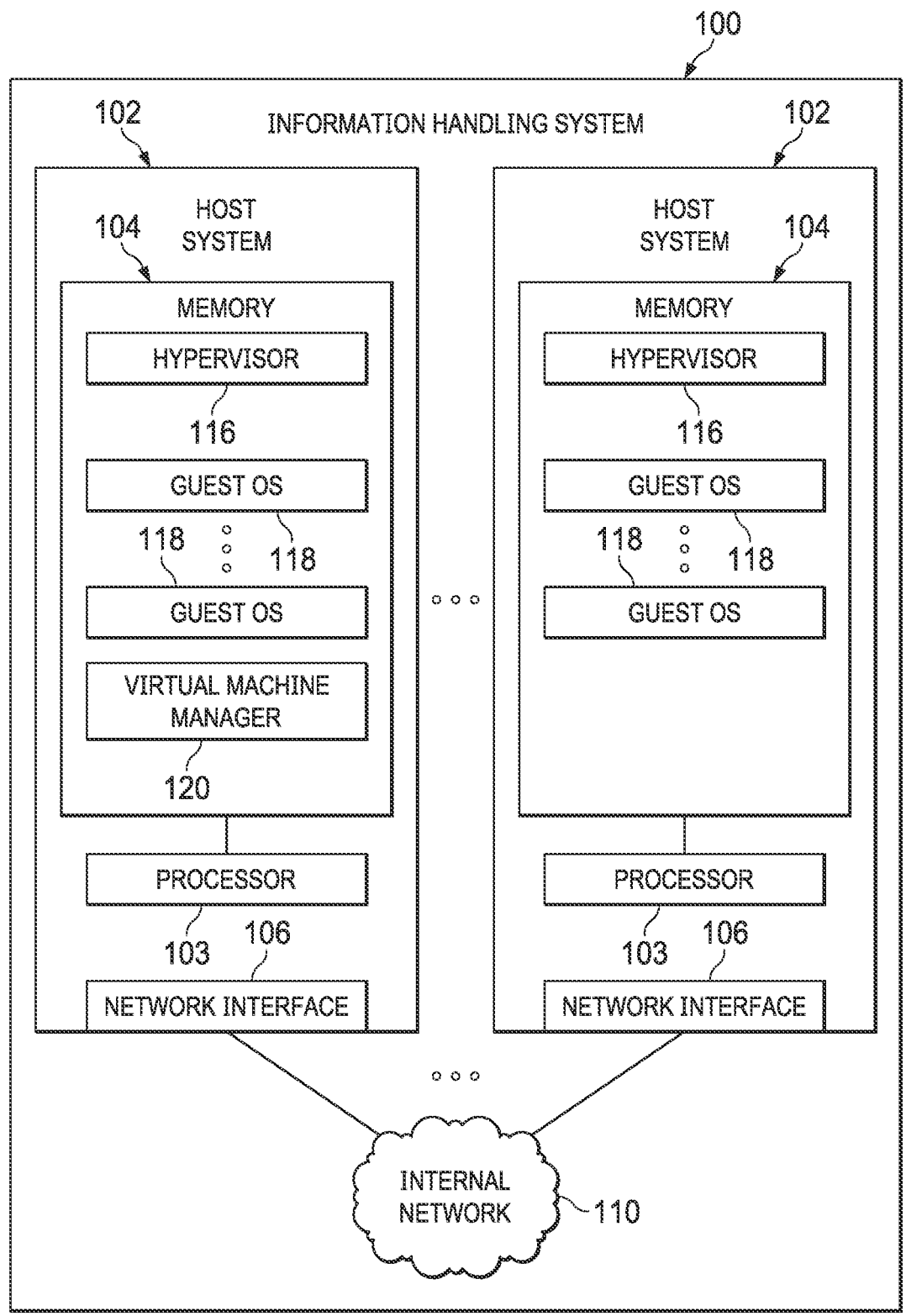
FIG. 1 illustrates a block diagram of selected components of an example information handling system, in accordance with embodiments of the present disclosure.
Figure 2A:
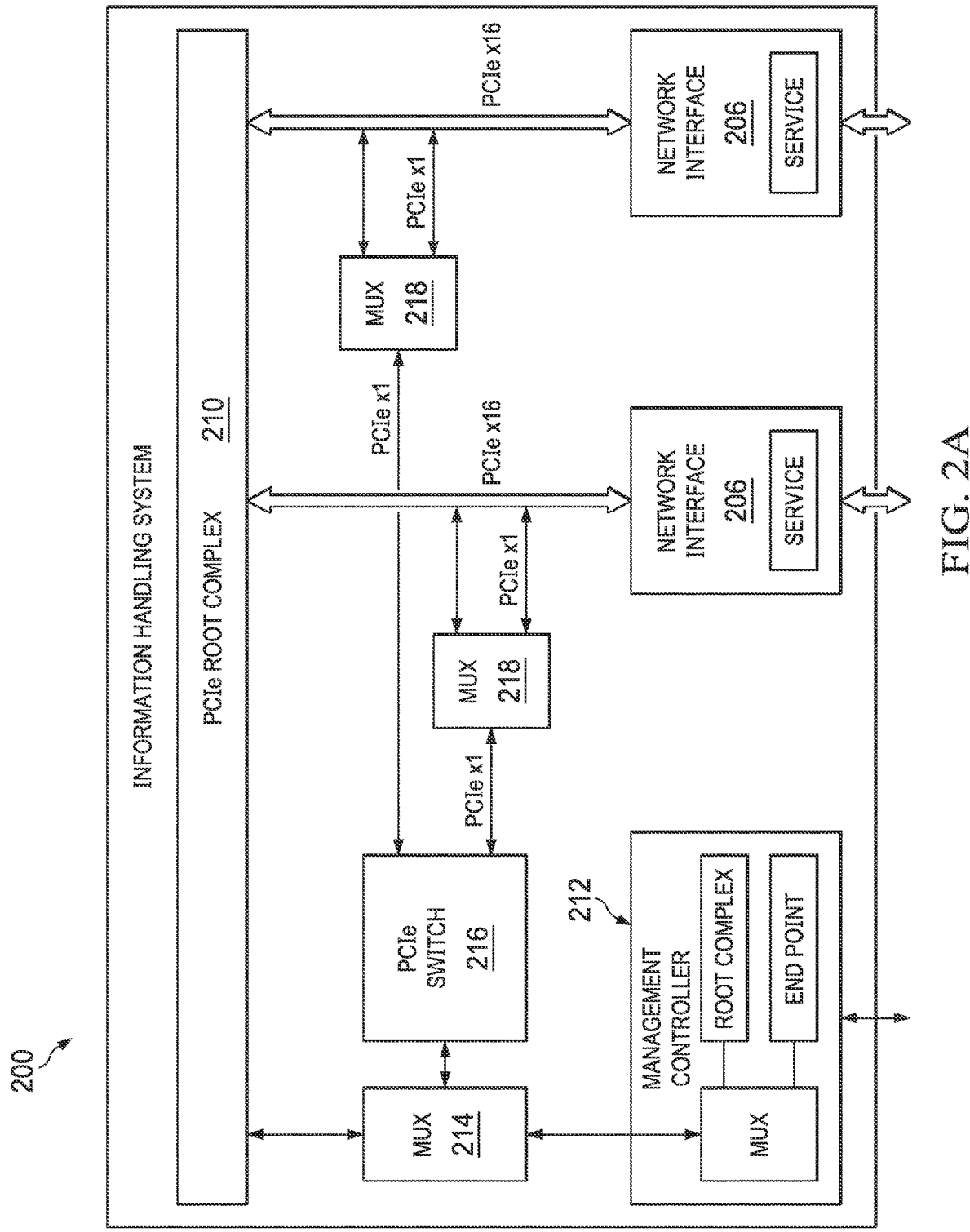
FIGS. 2A-2C illustrate block diagrams of selected components of an example information handling system, in accordance with embodiments of the present disclosure.
Figure 2B:
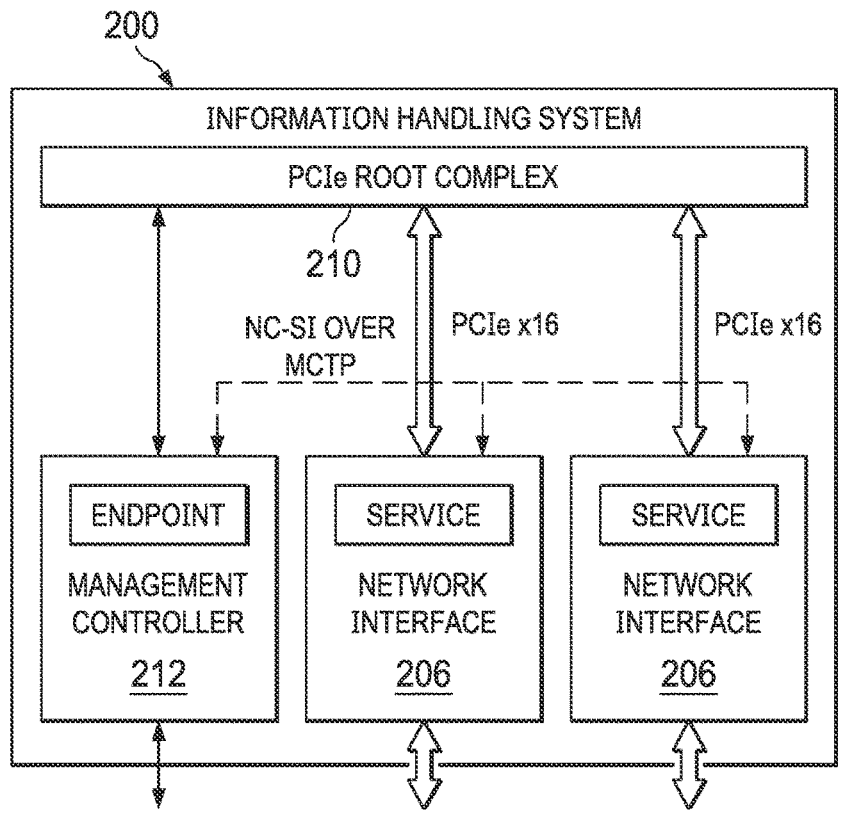
Figure 2C:
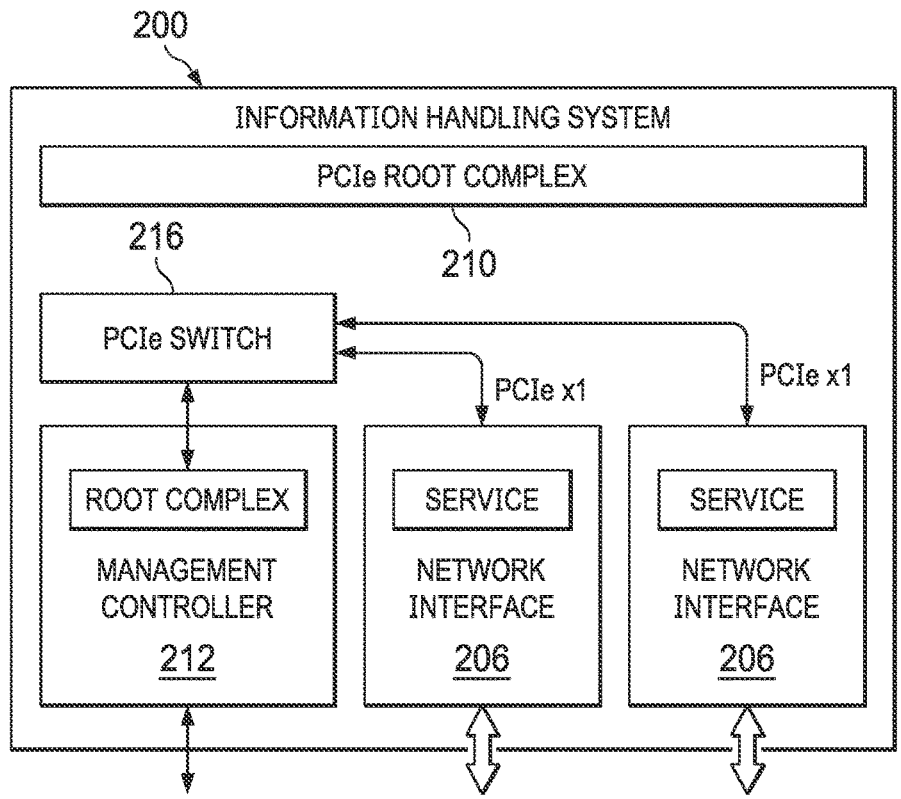

Preferred embodiments and their advantages are best understood by reference to FIGS. 1 through 2C, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 102 and internal network 110. A network interface 106 may enable its associated information handling system 102 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

Turning now to FIGS. 2A, 2B, and 2C, block diagrams of selected components of an information handling system 200 are shown, according to some embodiments. In particular, FIG. 2A illustrates an overview of the relevant components of information handling system 200, FIG. 2B illustrates information handling system 200 in operation while its host system is powered on, and FIG. 2C illustrates information handling system 200 in operation while its host system is powered off.

Information handling system 200 may include a host system that includes PCIe root complex 210, which is communicatively coupled to one or more network interfaces 206 (e.g., SmartNICs). For simplicity, the other components of the host system (e.g., processor(s), memory, storage, etc.) are omitted in these drawings. Network interfaces 206 may be SmartNICs in some embodiments. Information handling system 200 may also include a management controller 212 such as a BMC.

As shown in FIG. 2A, management controller 212 may operate both as a PCIe endpoint and as a root complex by virtue of multiplexer (MUX) circuitry included therein. Embodiments of this disclosure allow for the PCIe slots of the host system (e.g., slots housing one or more network adapters 206) to be accessed either via the host PCIe root complex 210 or via the PCIe root complex embedded in management controller 212. This may be accomplished via MUX 214, PCIe switch 216, and one or more MUXes 218.

When the host is powered on, management controller 212 is coupled to PCIe root complex 210 of the host as a PCIe endpoint. Management controller 212 and network interfaces 206 may communicate via PCIe root complex 210 using NC-SI over MCTP based on PCIe VDM. A service may execute on network interface 206 to access management controller 212 through the network which is set by NC-SI. Network interfaces 206 may also provide an in-band access ability for management controller 212 on their data ports.

When the host is powered off, a new sideband path is activated via MUX 214, PCIe switch 216, and MUX 218, such that management controller 212 couples its internal PCIe root complex to the PCIe ports housing network interfaces 206. Network interfaces 206 are thus coupled to management controller 212 through the PCIe bus and may register a NIC port for side-band communication.

In one embodiment, when the host powers down, circuitry (e.g., circuitry within management controller 212, on the host motherboard, or in any other suitable location) may detect the loss of power and implement the necessary changes in state to allow management controller 212 to communicate with network interfaces 206 via the new sideband interface. For example, management controller 212 may begin operating as a PCIe root complex device instead of a PCIe endpoint. Management controller 212 may then initialize the sideband PCIe bus. MUX 214 may decouple management controller 212 from PCIe root complex 210 and couple it instead to PCIe switch 216. PCIe switch 216 may allow management controller 212 to communicate with more than one network interface 206, if more than one such interface is present. And MUX 218 may decouple network interface 206 from PCIe root complex 210 and couple it instead to PCIe switch 216.

As shown, the PCIe link width need not be the same for both data paths. The PCIe link from PCIe root complex 210 is shown as an x16 sink in one embodiment, while the PCIe link from management controller 212 is shown as an x1 link.

Once the change-over has occurred, network interface 206 may register a NIC port on management controller 212, bridging this NIC port with its NC-SI port. When the initiation is finished, management controller 212 may bind its NC-SI port and all attached PCIe NICs to the same Ethernet bridge and transfer the IP address of the NC-SI port to this bridge. This arrangement may allow the network topology between management controller 212 and network interfaces 206 to be unchanged on both layers 2 and 3 of the network according to the Open Systems Interconnection (OSI) model. Thus for the services which need to access management controller 212 both inside and outside, network interface 206 can keep running seamlessly.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a host system including a first root complex;
   a management controller including a second root complex;
   a network interface controller; and
   at least one switching circuit;
   wherein the information handling system is configured to, in response to the host system being powered on:
   couple the network interface controller to the management controller via the first root complex; and
   wherein the information handling system is further configured to, in response to the host system being powered off:
   activate the at least one switching circuit to couple the network interface controller to the management controller via the second root complex.

2. The information handling system of claim 1, wherein the network interface controller comprises a plurality of network interface controllers.

3. The information handling system of claim 1, wherein the network interface controller comprises a SmartNIC.

4. The information handling system of claim 1, wherein the first and second root complexes comprise Peripheral Component Interconnect Express (PCIe) root complexes.

5. The information handling system of claim 4, wherein the at least one switching circuit comprises a PCIe switch.

6. The information handling system of claim 1, wherein the at least one switching circuit comprises a multiplexer.

7. A method comprising:
   while a host system that includes a first root complex is powered on, coupling a network interface controller to a management controller via the first root complex, wherein the management controller includes a second root complex; and
   in response to the host system being powered off, activate at least one switching circuit to couple the network interface controller to the management controller via the second root complex.

8. The method of claim 7, wherein the network interface controller comprises a plurality of network interface controllers.

9. The method of claim 7, wherein the network interface controller comprises a SmartNIC.

10. The method of claim 7, wherein the first and second root complexes comprise Peripheral Component Interconnect Express (PCIe) root complexes.

11. The method of claim 10, wherein the at least one switching circuit comprises a PCIe switch.

12. The method of claim 7, wherein the at least one switching circuit comprises a multiplexer.

13. An article of manufacture comprising a non-transitory, computer-readable medium having instructions thereon that are executable by a processor of an information handling system for:
   while a host system that includes a first root complex is powered on, coupling a network interface controller to a management controller via the first root complex, wherein the management controller includes a second root complex; and
   in response to the host system being powered off, activate at least one switching circuit to couple the network interface controller to the management controller via the second root complex.

14. The article of claim 13, wherein the network interface controller comprises a plurality of network interface controllers.

15. The article of claim 13, wherein the network interface controller comprises a SmartNIC.

16. The article of claim 13, wherein the first and second root complexes comprise Peripheral Component Interconnect Express (PCIe) root complexes.

17. The article of claim 16, wherein the at least one switching circuit comprises a PCIe switch.

18. The article of claim 13, wherein the at least one switching circuit comprises a multiplexer.

* * * * *